(12) United States Patent
Mackiewicz (10) Patent No.: US 8,714,317 B1
(45) Date of Patent: May 6, 2014

(54) DISC BRAKE

(75) Inventor: John E Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 2598 days.

(21) Appl. No.: 11/278,215

(22) Filed: Mar. 31, 2006

(51) Int. Cl.
*F16D 65/38* (2006.01)

(52) U.S. Cl.
USPC .................................. 188/73.39; 188/73.31

(58) Field of Classification Search
CPC .......... F16D 2055/0008; F16D 65/095; F16D 65/097; F16D 65/0972; F16D 65/0974; F16D 65/0975
USPC ............... 188/73.1, 73.31, 73.39, 70 R, 70 B, 188/73.34, 73.41, 71.1
See application file for complete search history.

(56) References Cited

U.S. PATENT DOCUMENTS

| | | | |
|---|---|---|---|
| 3,113,643 A | 12/1963 | Botterill | |
| 4,151,899 A * | 5/1979 | Wright | 188/73.38 |
| 4,155,431 A | 5/1979 | Johnson | |
| 4,222,466 A | 9/1980 | Brimaud | |
| 4,530,423 A | 7/1985 | Ritsema | |
| 4,560,038 A * | 12/1985 | Gerard et al. | 188/73.38 |
| 4,580,664 A * | 4/1986 | Kondo | 188/73.34 |
| 4,591,028 A | 5/1986 | Hagiwara | |
| RE32,470 E * | 8/1987 | Wright | 188/73.44 |
| 5,316,110 A * | 5/1994 | Null | 188/112 R |
| 6,000,506 A | 12/1999 | Warwick | |
| 6,173,819 B1 * | 1/2001 | Meiss et al. | 188/73.31 |
| 6,454,056 B1 | 9/2002 | Iida | |
| 6,511,135 B2 * | 1/2003 | Ballinger et al. | 303/112 |
| 6,533,080 B2 * | 3/2003 | Miyata | 188/73.37 |
| 7,513,340 B2 * | 4/2009 | Hendrich et al. | 188/73.38 |

FOREIGN PATENT DOCUMENTS

| | | | | |
|---|---|---|---|---|
| JP | 01224532 A * | 9/1989 | | F16D 65/04 |
| WO | WO 8911046 A1 * | 11/1989 | | F16D 55/224 |

* cited by examiner

*Primary Examiner* — Bradley King
*Assistant Examiner* — Stephen Bowes
(74) *Attorney, Agent, or Firm* — Maginot, Moore & Beck (57) ABSTRACT

A disc brake having spaced apart first cantilever beams that extend from an anchor and second cantilever beams that extend from the first beams back toward the anchor. A caliper is retained on the anchor by a pin to align first and second friction members with a rotor. Pressurized fluid that acts on a piston moves the first friction member into engagement with the rotor creates an axial force that axially slides the caliper on the pin and moves the second friction member into engagement with the rotor to create a clamping force that urges the friction members into engagement with the rotor. The clamping force rotates the caliper on the pin and brings the first friction member into engagement with the first cantilever beam and the second friction member into engagement with the third cantilever beam to oppose the rotation of the caliper during a brake application.

4 Claims, 6 Drawing Sheets

DISC BRAKE

This invention relates to a disc brake with spaced apart parallel first cantilever beams that extend from an anchor and second cantilever beams that extend back from the first cantilever beams toward the anchor that define first and second rails that receive actuation forces from first and second friction members carried by a caliper to resist movement of a rotor during a brake application wherein the caliper rotates and translates on a pin fixed to the anchor.

BACKGROUND OF THE INVENTION

In disc brakes, it is common for a caliper to straddle a rotor that is fixed to an axle of a vehicle and the caliper is secured to an anchor that is fixed to the housing of the vehicle. The caliper has a bore therein that retains an actuation piston to define an actuation chamber with a first friction member connected to the actuation piston and a second friction member connected to an arm that extends from the caliper. The first and second friction members are located on opposite sides of the rotor and when pressurized fluid is supplied to the actuation chamber, the piston moves the first friction member toward the rotor while the caliper has pins that extend there from that slide in bores in the anchor to move the second friction into engagement with the rotor to effect a brake application. The following U.S. Patents may be considered as illustrative of such a disc brake and its corresponding functional operation: U.S. Pat. Nos. 3,113,643; 4,530,423; 6,000,506 and 6,454,056. While all of the disc brakes disclosed by these patents have certain differences they function in a manner as describe above with the alignment of the caliper being achieved by the relationship of the pins with the bores in the anchor. Unfortunately the braking forces introduced into the anchor during a brake application can introduce a twisting moment into the caliper and as a result forces may impede the sliding of the pins within the bores during a brake application. This twisting moment can occur as the rail that extends from the anchor functions as a cantilever beam as the input force applied through the ear of the outboard friction pad moves the rail through a greater deflection than the input force applied through the ear of the inboard friction pad moves the rail. The twisting moment may not effect the functional sliding of the caliper when the input actuation forces are below a predetermined level but as the input actuation forces increase the twisting moment increased in a like manner until an adverse effect occurs in the sliding of the caliper on the pins. The disc brake disclosed in U.S. Pat. Nos. 4,155,431; 4,222,466 and 4,591,028 teaches the use of yokes and levers to move friction pads into engagement with a rotor without introducing of sliding friction but the complexity of such linkage toggle arrangements have not received wide acceptance in the manufacture of disc brakes.

SUMMARY OF THE INVENTION

The present invention provides a disc brake with spaced apart first cantilever beams that extend from an anchor and second cantilever beams that extend from the first beams back toward the anchor such that input forces generated during a brake application through the engagement of first and second friction members with a rotor are respectively applied to the first and second cantilever beams in such a manner that a caliper may freely rotate and translate on a pin connected to the anchor.

In more particular detail, the disc brake having and anchor with a base from which spaced apart first and second beams extend and are connected through an end member. The end member having third and fourth beams that extend there from back toward the base with the third beam defining a first rail with first and second grooves therein and the fourth beam defining a second rail with third and fourth grooves therein. The base being fixed to a housing of a vehicle to locate the first and second rails in perpendicular alignment with first and second faces on a rotor. A carrier plate for a first friction member is retained between the first groove in the first rail and the third groove in the second rail while a carrier plate for a second friction member is retained between the second groove in the first rail and the fourth groove in the second rail. A caliper defined by a housing has an actuation section with a first arm extending there from that is retained on a pin that is fixed to the anchor such that a piston retained in a bore is aligned with the second friction member and a second arm that is connected by a bridge to the actuation section aligns the second friction member with the first friction member. When pressurized fluid is presented to bore it act on the piston to move the first friction member into engagement with the rotor such that an axial force is created that acts on the housing causing the first leg to slide on the pin and thereby move the second leg and correspondingly the second friction member into engagement with the rotor to create a clamping force that urges the first and second friction members into engagement with the rotor. The clamping force causes the housing of the caliper to rotate on the pin and bring the first carrier plate into engagement with the first cantilever beam and the second carrier plate into engagement with the second cantilever beam to define an actuation force that opposes the rotation of the housing during a brake application. During the brake application, a first portion of the actuation force that is transmitted through the first carrier plate causes the first cantilever beam to deflect from a first location that is perpendicular to the anchor a first actuation position while a second portion of the actuation force that is transmitted through the second carrier plate causes the third cantilever beam to deflect from a first location that is perpendicular to the base to a second actuation position. The deflection of the first and third beams of the first rail being complementary such that the housing of the caliper may freely translate on the pin and the entire actuation force used in retarding rotation of the rotor when the rotor is rotating in a forward direction. Similarity, the actuation forces are received by the second rail during rotation of the rotor in a second direction to effect a brake application in a reverse direction.

An advantage of the invention resides in disc brake having a caliper that rotates on a pin to impart a braking force into an anchor whereby a first portion of the braking force created by the engagement of the first friction member with the rotor deflects a first beam and a second portion of the braking force created by the engagement of the second friction member with the rotor deflect a second beam such that the caliper freely translates on the pin as the caliper rotates on the pin toward the first and second beams.

A object of the present invention resides in a disc brake having rail defined by a first cantilever beam that deflects from a first location perpendicular to an anchor to a first actuation location in response to a first portion of a braking force and a second cantilever beam that extends from the first cantilever beam that deflects from a first location perpendicular to the anchor to a second actuation location in response to a second portion of the braking force such that first and second actuation locations are substantially in a same plane

DETAILED DESCRIPTION

In the specification where similar components are used the component may be identified by a number or a same number plus ' depending on a relationship with other components.

Figure 1:
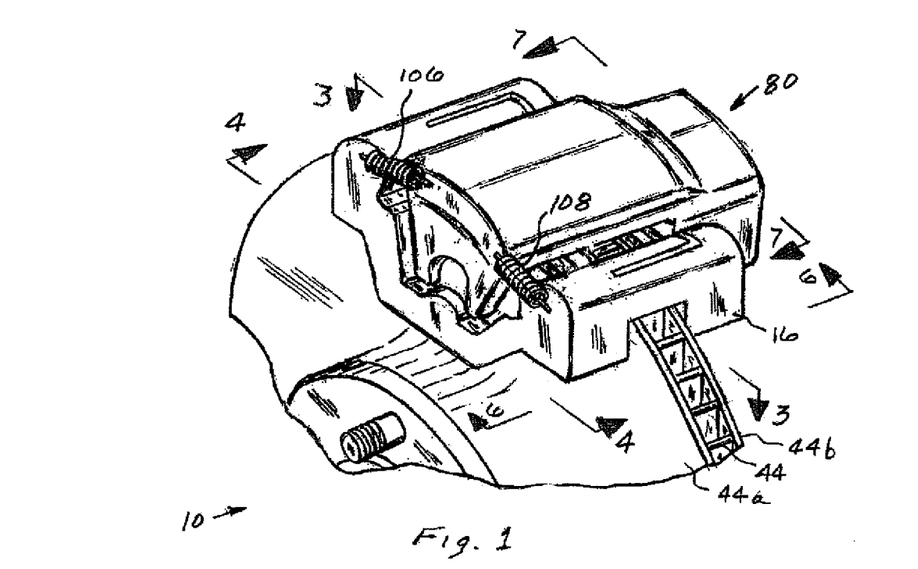
FIG. 1 is a front perspective view of a disc brake and rotor according to the present invention.
Figure 5:
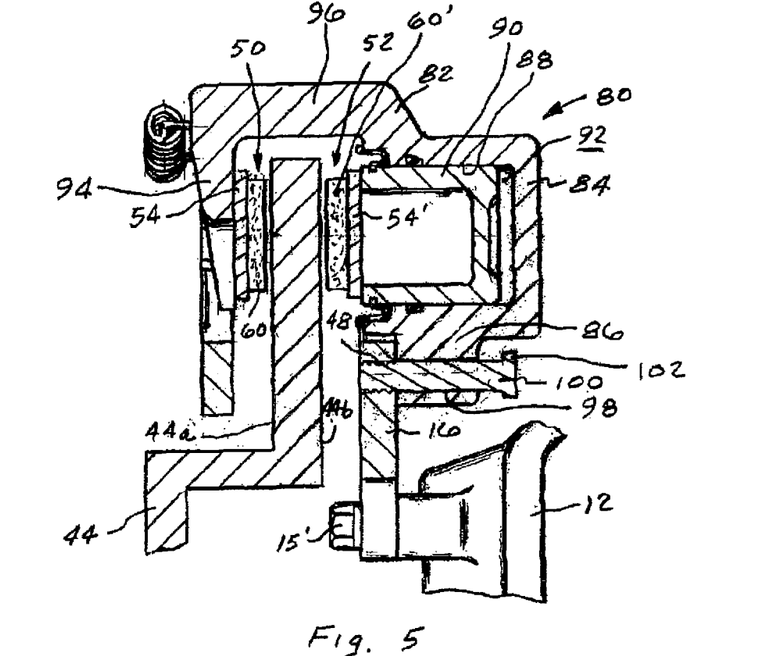
FIG. 5 is a view taken along line 5-5 of FIG. 4.
Figure 6:
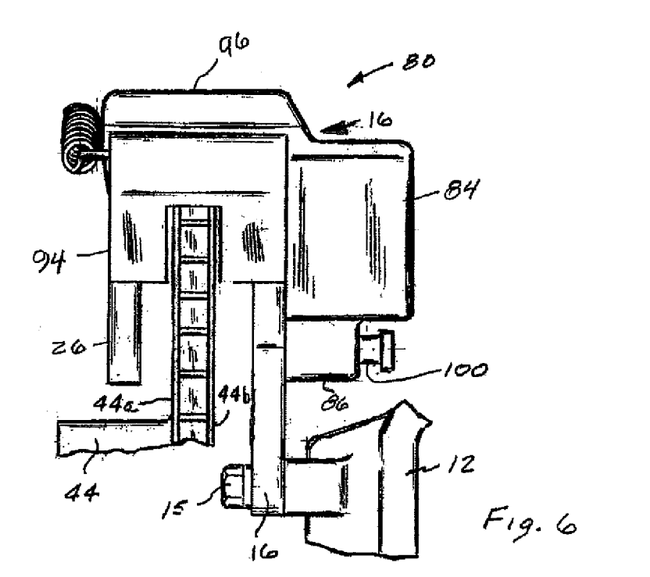
FIG. 6 is a view taken along line 6-6 of FIG. 1.

The disc brake 10 shown in FIG. 1 is made according to the present invention and is fixed to a wheel or axle support 12 for a vehicle as illustrated in FIGS. 5 and 6 by bolts 15,15' that extend through openings 14, 14' in anchor 16 to transmit braking forces into the support 12 during a brake application. The anchor 16 functions as a support for retaining first 50 and second 52 friction members and other components of disc brake 10 in a desired relationship with respect to a rotor 44 that is associated with a wheel for a vehicle.

Figure 2:
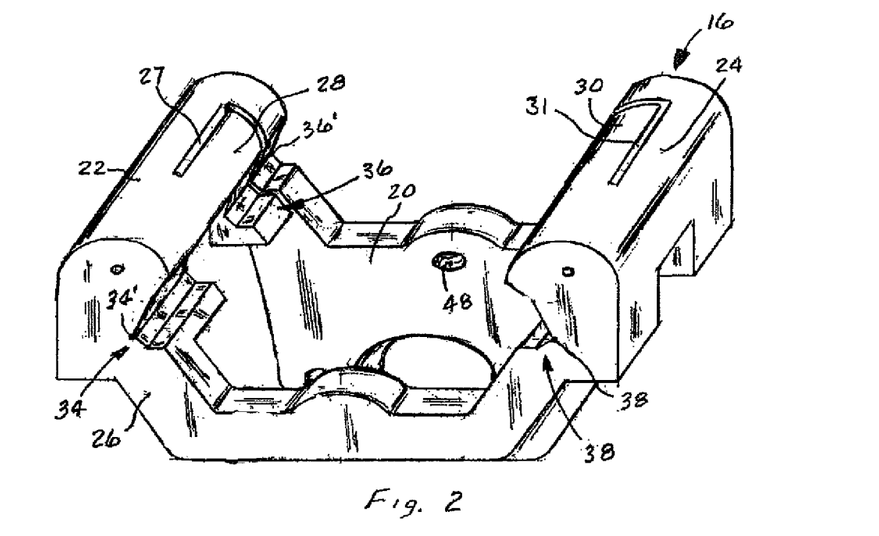
FIG. 2 is a perspective view of an anchor for the disc brake of FIG. 1.

The anchor 16, as shown in FIG. 2 is integrally cast and has a substantially rectangular body with a base 20 that is spaced apart first 22 and second 24 beams that extend there from and are connected to each other by an integral end member 26. The end member 26 has third 28 and fourth 30 beams that extend there from back toward the base 20. The first beam 22 and third beam 28 define a first rail with first 34 and second 36 grooves located therein for respectively receiving first ears of the first 50 and second 52 friction members while the second beam 24 and fourth beam 30 define a second rail with third 38 and fourth 40 grooves therein for respectively receiving second ears of the first 50 and second 52 friction members. The first beam 22 and end member 26 functions as a first cantilever beam wherein the first groove 34 is located in a perpendicular relationship with base 20 and with a rotor 44 when base 20 is fixed to support 12 by bolts 15, 15' and the third beam 28 that extends from the end member 26 toward base 20 functions as a second cantilever beam that is also located in a perpendicular relationship with base 20, see FIG. 3. The length of the second cantilever beam may be adjusted by extending the slot 27 that is located between the first beam 20 and third beam 28. Similarly, the second beam 24 and end member 26 functions as a third cantilever beam wherein the third groove 38 is located in a perpendicular relationship with base 20 and the fourth beam 40 that extends from end member 26 back toward base 20 functions as a fourth cantilever beam that is also in a perpendicular relationship with base 20 whose length is defined by the length of slot 31. The second beam 28 and fourth beam 40 are identical in both length and function to receive a portion of the rotational force generated during a brake application. The base 20 also has an axial opening 48 that is parallel with the first and second rails such that a vertical plane through the opening 48 is located an equal actuate distance from an apex 36' of groove 36 that extends into base 20 and from an apex 40' of groove 40 that extends into base 20. The shape of each groove 34, 36, 38 and 40 is defined by transitional slopes from a face toward the respective apexes 34', 36', 38' and 40'.

Figure 3:
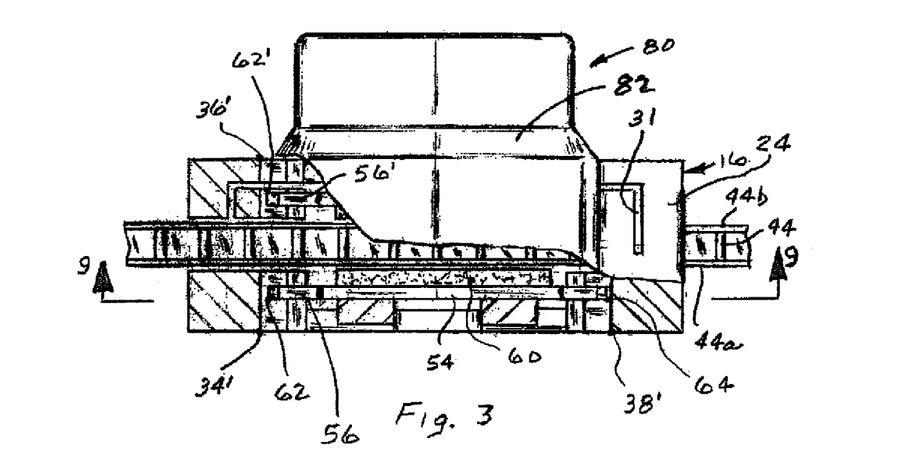
FIG. 3 is a top view taken along line 3-3 of FIG. 1 with a partial sectional view showing the relationship of the end of a first carrier for a first friction member with a first cantilever beam and the end of a second carrier of a second friction member with a second cantilever beam.
Figure 4:
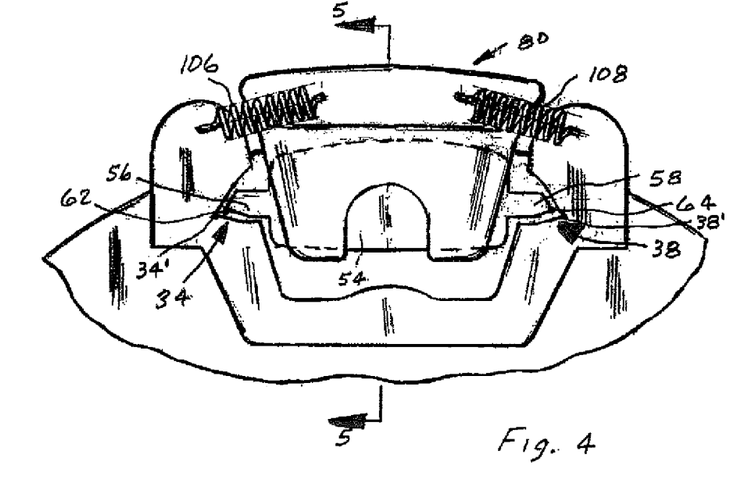
FIG. 4 is a view taken along line 4-4 of FIG. 1.
Figure 7:
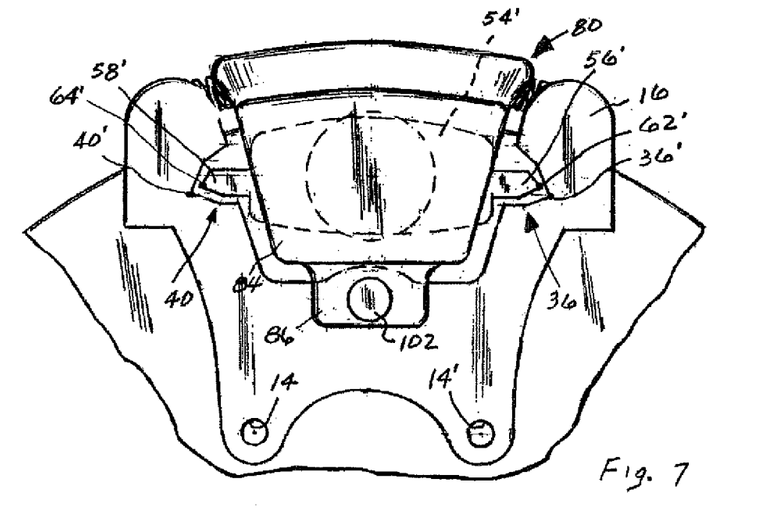
FIG. 7 is a view taken along line 7-7 of FIG. 1.

The first friction member 50 and the second friction member 52 are identical and as best shown in FIGS. 3, 4, 5 and 9, each of which includes a carrier member 54 having a first ear or end 56 and a second ear or end 58 with a pad 60 affixed to the carrier member 54. The first end 56 has an apex 62 and the second end 58 has an apex 64 and when positioned in caliper 80 are located along a radial arc plus an at rest tolerance with respect to the axis of anchor 16. The first ear 56 on the carrier member 54 for the first friction member 50 is positioned in the first groove 34 and the second end 58 on carrier member 54 of the first friction member 50 is positioned in the third groove 38 as illustrated in FIG. 4 while the first ear 56' on the carrier member 54' for the second friction member 52 is positioned in the second groove 36 and the second ear 58' on carrier member 54' is positioned in the fourth groove 40 as illustrated in FIG. 7.

The caliper 80, as best shown in FIGS. 1, 3, 4, 5, 6 and 7 has a housing 82 with an actuation section 84, a first leg 86 extends from the housing 82, a first bore 88 for retaining a piston 90 to create an actuation chamber 92 and a second leg 94 that is connected by a bridge 96 to the actuation section 84. The second leg 94 is parallel with the first leg 86 and perpendicular to a bore 98 that extends through the first leg 86.

The caliper 80 is attached to the anchor 16 by a pin 100 that extends through bore 98 in leg 86 and is threaded into axial opening 48 in anchor 16. The pin 100 has a length that extends past the face on the first leg 86 an amount that is greater than the initial thickness of pad 60 in the first friction member 50 and for safety measures may have a head 102 on the end thereof to assure that the caliper 80 is positively retained on the anchor 16 prior to attachment to a vehicle.

When pin 100 is secured to anchor 16, the first friction member 50 that is connected to the second arm 94 of the caliper 80 and aligned with rotor face 44a while the second friction member 52 is connected with piston 90 and aligned with rotor face 44b of rotor 44 as illustrated in FIG. 5.

The caliper 80 is maintained in a position that is equal in distance from the first rail and the second rail of anchor 16 by a first spring 106 and second spring 108 attached thereto as illustrated in FIGS. 1 and 4.

Mode of Operation of the Disc Brake

Figure 9:
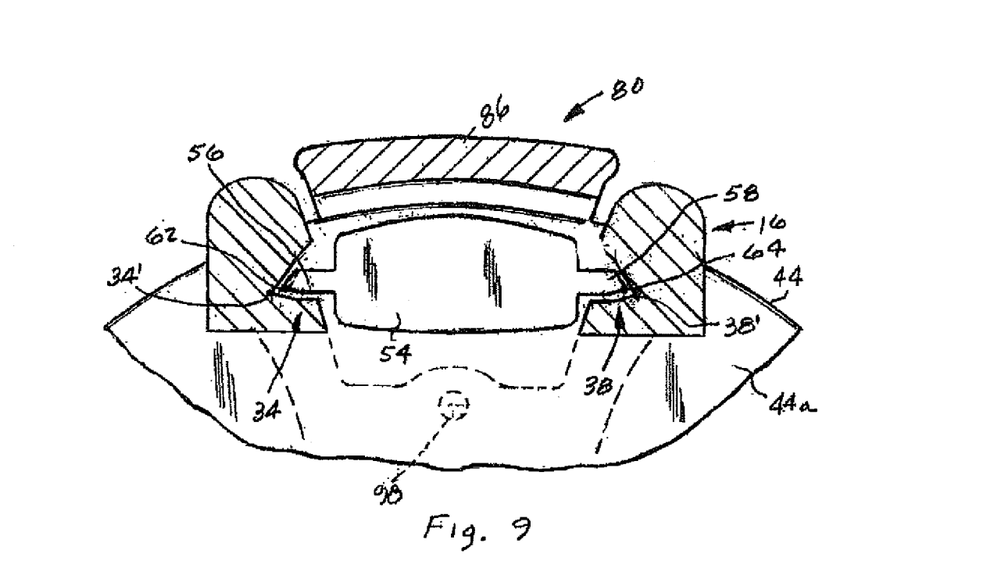
FIG. 9 is a view taken along line 9-9 of FIG. 3 showing a relationship between a carrier member of the first friction member and the first and second rails with the caliper for the disc brake in a position of rest.
Figure 10:
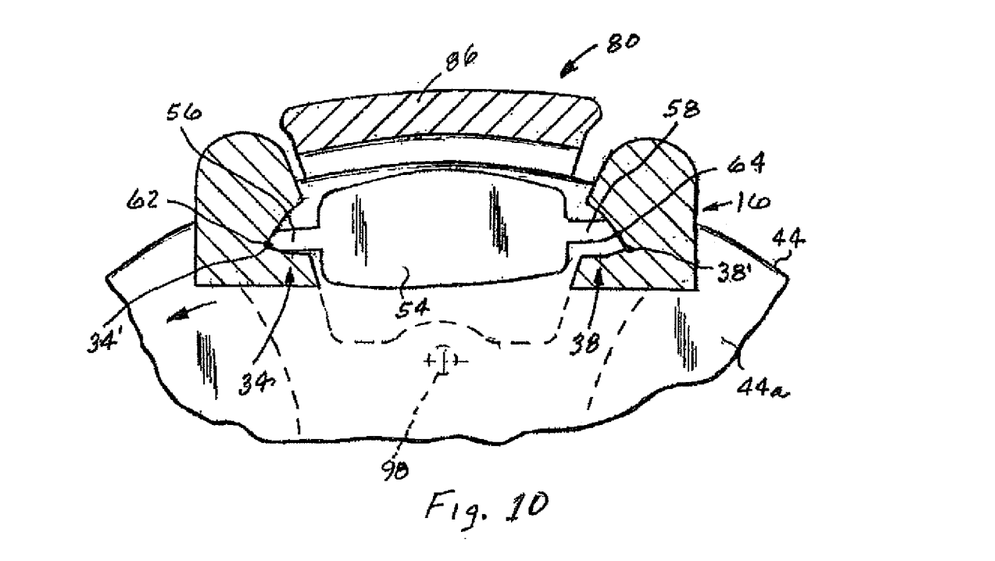
FIG. 10 is a view of the first friction member showing the relationship between the carrier member of FIG. 9 and the first and second rails during a brake application when the pad for the first friction member engages a rotor that is rotating in a first direction indicated by the arrow.

When it is desirable to effect a brake application with a vehicle equip with disc brake 10, pressurized fluid is supplied to actuation chamber 92. The pressurized fluid simultaneously acts on piston 90 to move the pad 60' on the second friction member 52 into engagement with rotor face 44b and on housing 82 of the caliper 80 to create an axial force that causes the first leg 86 to slide on pin 100 and move the pad 60 on the first friction member 50 into engagement with rotor face 44a. Engagement of the first 50 and second 52 friction members with rotor 40 creates a clamping force that causes housing 86 to rotate on pin 100 and moves the first 50 and second 52 friction members from a position of rest as illustrated in FIGS. 3 and 9 toward either the first rail or the second rail. For explanation, it is assumed that rotor 44 is rotating in a manner illustrated by the arrow in FIG. 10, such that apex 62 on the first ear 56 of the first friction member 50 is brought into engagement with apex 34' in groove 34 and the second ear 64 of the first friction member 50 engages the transitional slope of groove 38 to retain the first friction member 50 along an arcuate plane with respect to groove 34 similarly apex 62' on first ear 56' of the second friction member 52 is brought into engagement with apex 36' of groove 36 while second ear 64' of the second friction member 52 engages the transitional slope of groove 40 to retain the second friction member 52 in a same arcuate plane as the first friction member 50 as housing 85 pivots about pin 100. The clamping force generated by the engagement of the first 50 and second 52 friction members with rotor 44 is equally divided into a first actuation force that is transmitted through the first ear 56 on the first friction member 50 and a second actuation force that is transmitted through the first ear 56' on the second friction member 52. The first actuation force is resisted by the first beam 22 while the second actuation force is resisted by the second beam 28 of the first rail. The engagement of the apex 62 of the first ear 56 with the apex 34' of groove 34 in beam 22 and apex 62' of the first ear 56' with apex 36' of groove 36 in beam 28 occurs on a same radial arc of the axis of the anchor 16 and as a result the actuation forces are directly opposed by resistive forces of the first rail without the development of resultant normal forces that could effect the rotation of the housing 86 on the pin 100.

Figure 8:
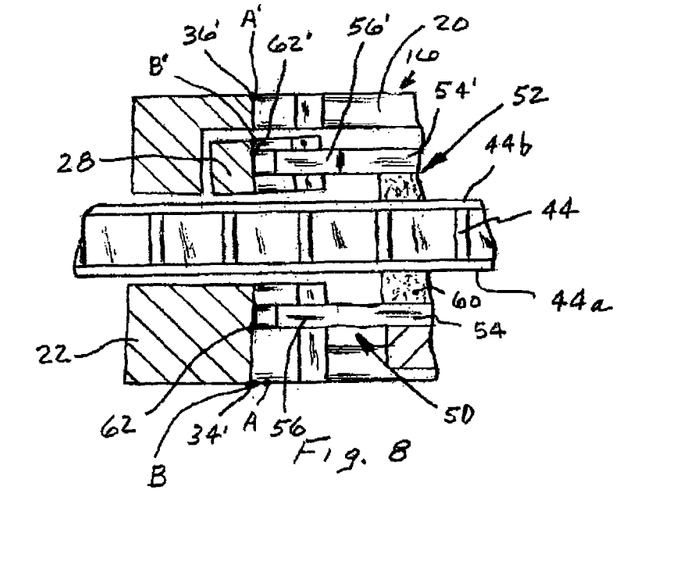
FIG. 8 is a view of a portion of FIG. 3 showing the relationship of the end of the first carrier for the first friction member with a first cantilever beam and the end of a second carrier of a second friction member with a second cantilever beam during a brake application.

Initially the engagement point of the apex 62 of the first ear 56 of the first friction member 50 with the first groove 34 and apex 62' of the first ear 56' of the second friction member 52 with the second groove 36 occurs along a plane that is perpendicular to the base 20 of the anchor 16. As the actuation force develops and increases during a brake application, equal portions are transmitted through the first carrier 54 for the first friction member 50 and through the second carrier 54' for the second friction member 52. The first portion of the actuation force carried through the first ear 56 of the first friction member into beam 22 and causes the first beam 22 to flex or deflect from its perpendicular location "A" with respect to the base 20 to an actuation position "B" as illustrated in FIG. 8 while at the same time the second portion of the actuation force transmitted by the first ear 56' of the second friction member 52 into beam 28 and causes beam 28 to flex or deflect from its perpendicular relationship "A") with respect to base 20 to an actuation position "B" as illustrated in FIG. 8. The flexure or deflection of beams 22 and 28 is complementary and apexes 62, 62' remain aligned in a same plane with respect to the base 20 and as a result no side loading is introduced into housing 86 that would effect the translation of housing 86 on pin 100 and consequently all of the actuation force is resisted by the first rail without effecting either translation or rotation of the housing 86 with respect to pin 100.

When the pressurized fluid is removed from the actuation chamber 92, return springs 106, 108 return the housing 86 to a position of rest that is an equal distance between the first and second rails as illustrated in FIG. 9.

Figure 11:
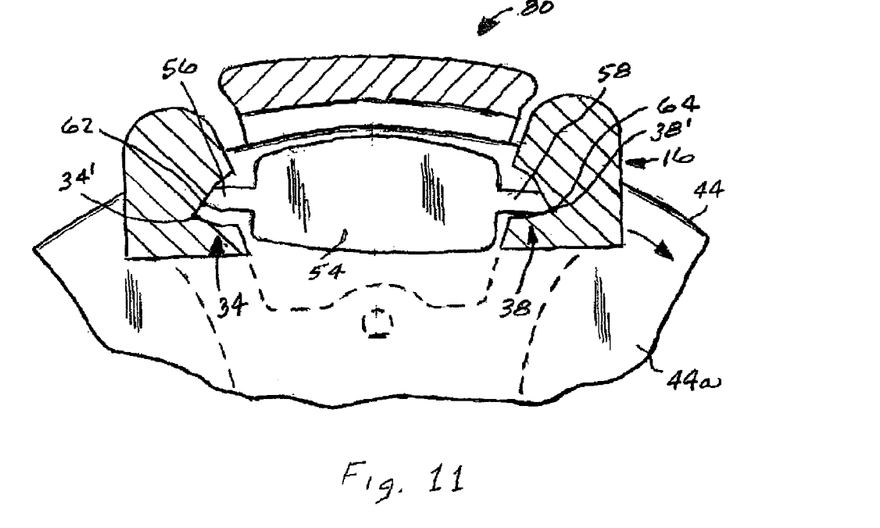
FIG. 11 is a view of the first friction member showing the relationship between the carrier member of FIG. 9 and the first and second rails during a brake application when the pad for the friction member engages a rotor that is rotating in a second direction indicated by the arrow.

When the rotor is turning as in a direction as illustrated by the arrow in FIG. 11, and a clamping force is created during a brake application, the first portion of the actuation force is transmitted through the apex 64 of the second end 58 of the first friction member 50 into apex 38' of groove 38 in the second rail and the second portion of the actuation force is transmitted through apex 64' of the second end 58' of the second friction member 52 into apex 40' of groove 40 in the second rail. As the resistance to the actuation force increases, the second beam 24 deflects from its perpendicular relationship with base 20 while the fourth beam 30 deflect with respect to the second beam in a complementary manner such that the respective apex 64, 64' remain in a same alignment without the introduction of a moment or side load on the housing 86 of the caliper 80. As before when the pressurized fluid is removed from chamber 92, springs 106,108 returns the housing 86 to position of rest mid-way between the first and second rails as illustrated in FIG. 9.

Figure 12:
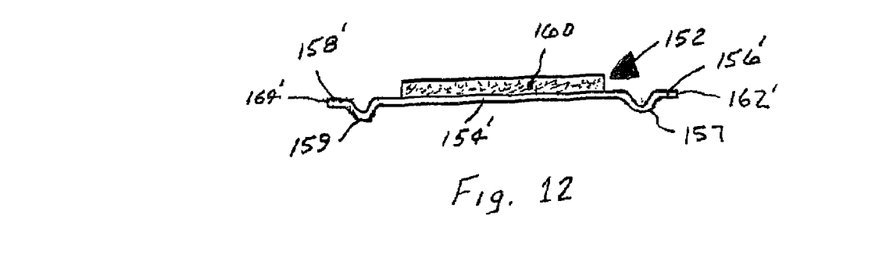
FIG. 12 is a view of another embodiment for the second friction member wherein the resilient ends that may be compressed during a brake application.

The deflection of the third 28 and fourth 30 cantilever beams may be enhanced through the use of a carrier 154' for the second friction member 152 as illustrated in FIG. 12. In this embodiment, the carrier 154' supports a pad 160, and further the carrier 154' has a first ear 156' with a resilient section 157 and a second ear 158' with a resilient section 159. The resilient sections 157 and 159 are designed to collapse or be compressed during the communication of an actuation force into the rail during a brake application and as a result apex 162' remains aligned with apex 62 on carrier 54 or apex 164' remains aligned with apex 64 on carrier 54 during a brake application to reduce the introduction of side loading into housing 86 that would effect translation or rotation of caliper 80 on pin 100.

What is claimed is:
1. A disc brake comprising:
a support member having a base, an end member laterally spaced apart from said base, and spaced apart first and second beams that extend between and connect said base to said end member, said end member having third and fourth beams that extend there from toward said base, said first and said third beam defining a first rail with first and second grooves therein and said second beam and said fourth beam defining a second rail with third and fourth grooves therein, said base being configured to be fixed to a vehicle housing with said first, second, third, and fourth beams perpendicular to first and second faces on a rotor;
a first friction member having a first carrier plate retained between the first groove in the first rail and the third groove in the second rail;
a second friction member having a second carrier plate retained between the second groove in the first rail and the fourth groove in the second rail;
a caliper defined by a caliper housing having an actuation section with a first leg extending there from, a first bore located in the actuation section with a piston retained therein to create an actuation chamber and a second leg that is connected by a bridge to the actuation section, said first leg having a second bore that extends there through; and
a pin that extends through said second bore in said first leg of the caliper and is connected to the base of the support member such that the piston is aligned with the first friction member and the second leg is aligned with the second friction member,
wherein said caliper and said pin are configured so that, in response to pressurized fluid being presented to the actuation chamber, said piston moves said first friction member into engagement with the first face on the rotor and acts on the caliper housing to cause the first leg to slide on said pin and move the second friction member into engagement with the second face on the rotor to create a clamping force on the rotor, and
wherein said caliper and said pin are further configured so that, in response to creation of the clamping force on the rotor, the caliper housing is caused to rotate on said pin and bring the first and second carrier plates into engagement with one of the first and second rails.

2. The disc brake as recited in claim 1 wherein the engagement of the first carrier plate with said one of said first and second rails and the engagement of said second carrier plate with said one of said first and second rails in opposing the rotation of the rotor define a first force and a second force, said first force including a first input transmitted through the first carrier plate that causes said first beam of the first rail to deflect from a first location that is perpendicular to said base to a first position and a second input transmitted through the second carrier plate that causes said third beam of the first rail to deflect from a first location that is perpendicular to the base to a second position, said deflection of said first beam and said third beam of said first rail being complementary such that the caliper housing may freely translate on said pin.

3. The disc brake as recited in claim 1 wherein said first beam of said first rail comprises a first cantilever member and said third beam of said first rail comprises a second cantilever member.

4. The disc brake as recited in claim 3 wherein the length of said third beam is selected to match the deflection of the third beam with the deflection of the first beam and as a result the rotation of the first beam in response to the first input force and the rotation of the third beam in response to the second input force are substantially equal.

\* \* \* \* \*